United States Patent
Daniel et al.

(10) Patent No.: US 8,047,049 B2
(45) Date of Patent: Nov. 1, 2011

(54) CONFORMAL SENSOR TAPE

(75) Inventors: Jurgen H. Daniel, San Francisco, CA (US); Sanjiv Sambandan, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 12/356,044

(22) Filed: Jan. 19, 2009

(65) Prior Publication Data

US 2010/0180701 A1    Jul. 22, 2010

(51) Int. Cl.
*G01M 13/001* (2006.01)
(52) U.S. Cl. ....................................... 73/11.04
(58) Field of Classification Search .............. None
See application file for complete search history.

(56) References Cited

U.S. PATENT DOCUMENTS

| | | | | |
|---|---|---|---|---|
| 4,755,090 A | * | 7/1988 | Macfee et al. | 411/82 |
| 5,621,922 A | * | 4/1997 | Rush, III | 2/422 |
| 6,205,425 B1 | * | 3/2001 | Ho | 704/251 |
| 2005/0190068 A1 | * | 9/2005 | Gentry et al. | 340/665 |
| 2007/0177651 A1 | * | 8/2007 | Daugherty et al. | 374/163 |
| 2009/0013802 A1 | * | 1/2009 | Orlewski et al. | 73/862.046 |
| 2009/0255335 A1 | * | 10/2009 | Fly et al. | 73/493 |

* cited by examiner

*Primary Examiner* — Robert Raevis
(74) *Attorney, Agent, or Firm* — Marger Johnson & McCollom, P.C.

(57) ABSTRACT

A sensing device has at least two remote units mounted on an attachable tape, the remote units being mounted on separate branches of the attachable tape, a controller mounted on the attachable tape, electrical connections at least between each remote unit and the controller, the electrical connections on the attachable tape, and a surface to which the tape is attached such that the branches are separated from each other. A method of manufacturing a sensing device, including providing an attachable substrate, and fabricating electronic devices on the substrate, the electronic devices including at least two remote units, a controller and electrical connections between the remote units and the controller, and arranging the electronic devices such that at least two remote units are separated from each other.

10 Claims, 7 Drawing Sheets

CONFORMAL SENSOR TAPE

GOVERNMENT FUNDING

This invention was made with Government support under Contract No. W81XWH-08-C-0065 issued by the Defense Advanced Research Projects Agency (DARPA). The Government has certain rights in this invention.

BACKGROUND

Sensor tapes allow gathering of data from surfaces that is generally more accurate than other types of sensors because the sensors conform to the surface. This allows a more accurate reading along the surface, whether planar or curved, and therefore provides more accurate data to analysis and read out electronics. Moreover, sensor tapes may be manufactured by inexpensive fabrication processes that pose limitations on the sensor design. However, since the fabrication is inexpensive, tapes with multiple sensors and distributed sensors can be made. Therefore, multiple sensors on one tape in different locations compensate for the lack of performance of the individual sensors.

Current sensor tapes include VarioSens data loggers from KSW-Microtec. Generally, these consist of adhesive 'labels' that monitor temperature and may include a radio frequency identification (RFID) tag. The loggers are started at the beginning of a sensing episode and then the information logged is downloaded to a PC or RFID card reader at the end.

Other examples include medical skin patches, such as a biopolymer skin patch available from ISIS, Alza's E-Trans, and the iontophoretic patch available from Vyteris. These are generally square or round patches that have individual sensor electrodes, but are not monolithically integrated. This is similar to the VarioSens data loggers, as each one is a discrete component.

A disadvantage of these discrete components is that they are not very useful when attached to an object having multiple points upon which readings are actions are desired. Each individual sensor component may be mounted in different areas of the curved surface, but they would have to be somehow tied together to model the surface. This leads to a less-than-robust sensing solution and has an increased complexity.

DETAILED DESCRIPTION OF THE EMBODIMENTS

Figure 1:
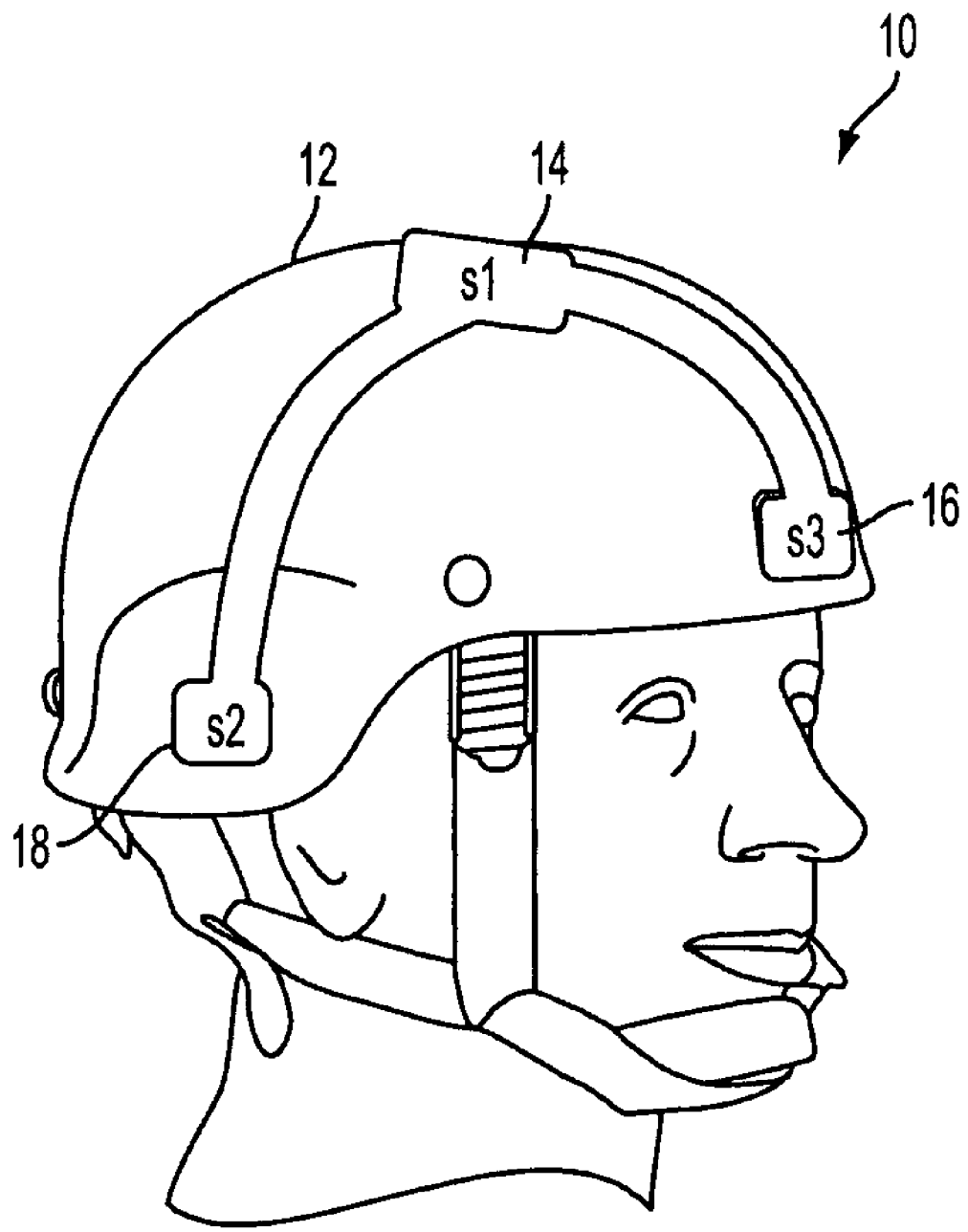
FIG. 1 shows an embodiment of a sensor tape sensing device.

FIG. 1 shows an example of a sensor tape device 10 mounted to an object. In this embodiment, the sensor tape is mounted to a curved surface but mounting the tape to any object, planar or not, would be useful as well. The term 'tape' means any substrate capable of being adhered or otherwise attached to a surface upon which remote units such as sensors and actuators and other electrical components reside. The electrical components may include sensors and actuators, electrical connection traces or lines, a controller, memory circuitry, passive components such as resistors and capacitors, discrete electronic components manufactured elsewhere and placed on the substrate, etc.

The attachment may result from an adhesive such as glue or epoxy, pressure sensitive adhesive tape or may result from applying heat to a thermoplastic substance, etc. The attachment may also result from magnetic force, such as when the tape surface contains magnetic materials such as iron, cobalt, nickel or magnetite or neodymium based magnetic materials. In one example the sensor tape is attached via a magnetic tape, such as those available from Abel Magnets Ltd. of Sheffield, UK. The tape may also be attachable by hook and look closures, similar to Velcro®, or suction cups. For purposes of this discussion, the tape will be referred to as being 'attachable.'

The substrate may be one of several different substances, such as plastics, including thermoplastics and elastomers; paper; metals, such as thin sheet metal; or cloth. Examples of plastic substrates include Mylar™, Polyethylene naphthalate (PEN), polysulfone, polycarbonate, polyesters, polyimides, epoxides, urethanes, silicones, etc.

While the substrate to which the remote units are attached may be referred to here as 'sensor' tape, the remote units may be devices other than sensors, generally classified as actuators. Examples of sensors include temperature, light, radiation, pressure, strain, flow, magnetic, acceleration, acoustic, moisture, gas, chemical or biological sensors. Examples of actuators include audio speakers, optical modulators, radio frequency emitters, ultrasound emitters, more generally radiation emitters, or light emitters. The actuators may also consist of pumps or ejectors to dispense a gas or a liquid.

The remote units will be positioned on the device separated from each other by a distance and generally residing on separate 'branches' of the tape from each other. This allows distributed sensing or actuation. The controller, which may include power supplies, batteries, drive electronics, signal conditioning circuits, memory, read out devices, data transmission circuitry or analysis logic, will generally reside at one end of the branches. The branches of tape will generally radiate outward from the controller. The read out device may consist of several different options, alone or in combination, including a connector to allow downloading of the data in memory, a small display, or a wireless communications device using infrared (IR) or radio frequency (RF).

As seen in FIG. 1, the sensing device 10 has three remote units 14, 16 and 18, attached to a curved surface 12, in this case a helmet. By positioning the remote units in different points on the curved surface, a better three-dimensional 'picture' of the environment may be achieved than if one just used a single sensor. For example, a single sensor mounted at 14 would not provide a very accurate sample of the environment at positions 18 or 16.

Further, using multiple remote units and multiple positions, the environment at different positions can be sensed and different elements of the environment may be sensed. For example, the remote unit mounted at 18 may have a blast sensor in the form of an accelerometer or pressure sensor to sense the pressure wave from a blast. Alternatively, the sensor could be an acoustic sensor to gather data about the noise from a blast that may affect the wearer's hearing. The remote unit located at position 16 may consist of a light sensor, to judge the ambient viewing light, or could even consist of a light emitter, such as a head-mounted flashlight.

In one example, the tape records blast events from explosions in the battlefield. Bright light, heat waves, pressure waves, acceleration and acoustic signals are recorded in order to provide early medical treatment for traumatic brain injury. The tape may also be attached to helmets in sports such as football in order to measure acceleration caused by impact with other players or with the floor. However, tapes may also be used in structural monitoring to monitor vibration of surfaces or strain in surfaces.

In FIG. 1, the controller could be located at position 14, with or without adjacent remote units. Alternatively, the controller could be located at a position at the back of the helmet, or even mounted inside the helmet between the shell of the helmet and webbing straps used to secure the helmet to the head, keeping the controller out of the user's way.

Figure 2:
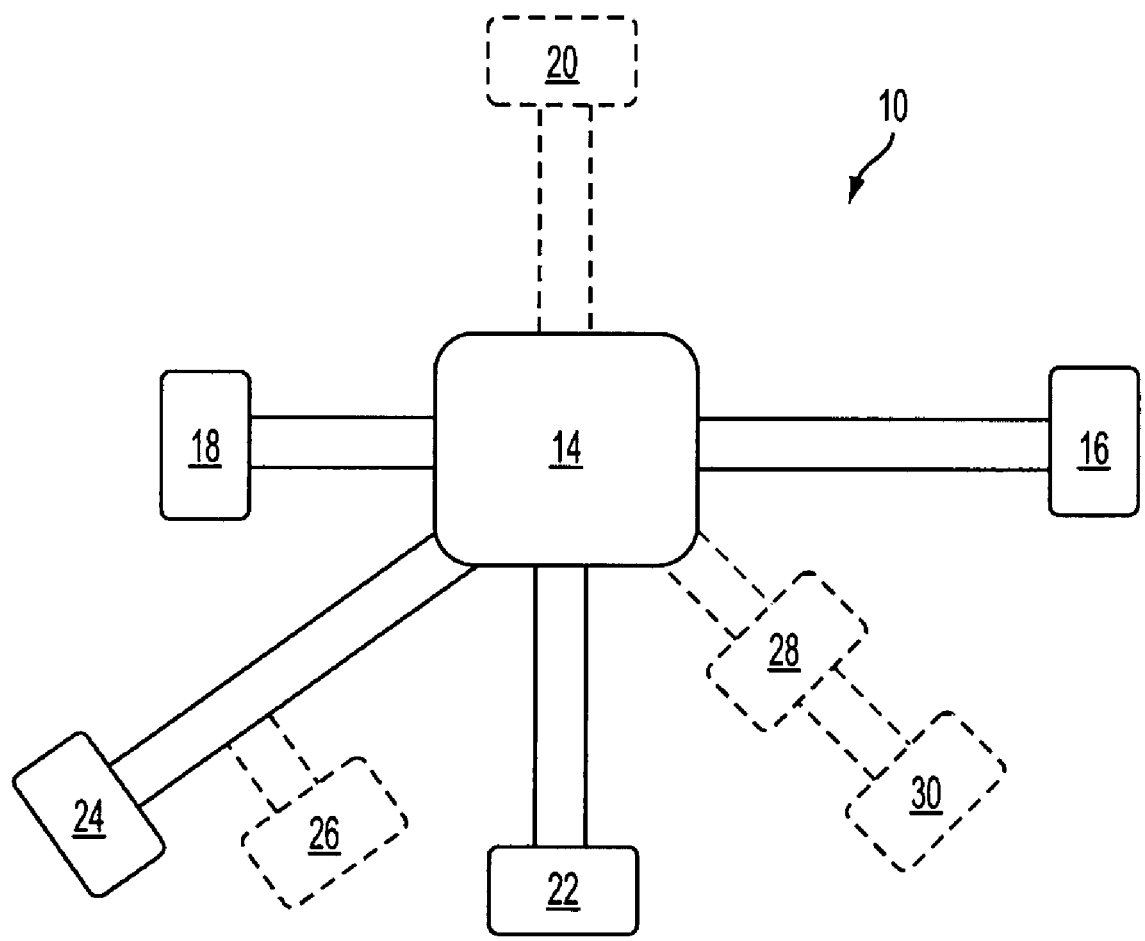
FIG. 2 shows an embodiment of a layout for a sensor tape sensing device.
Figure 3:
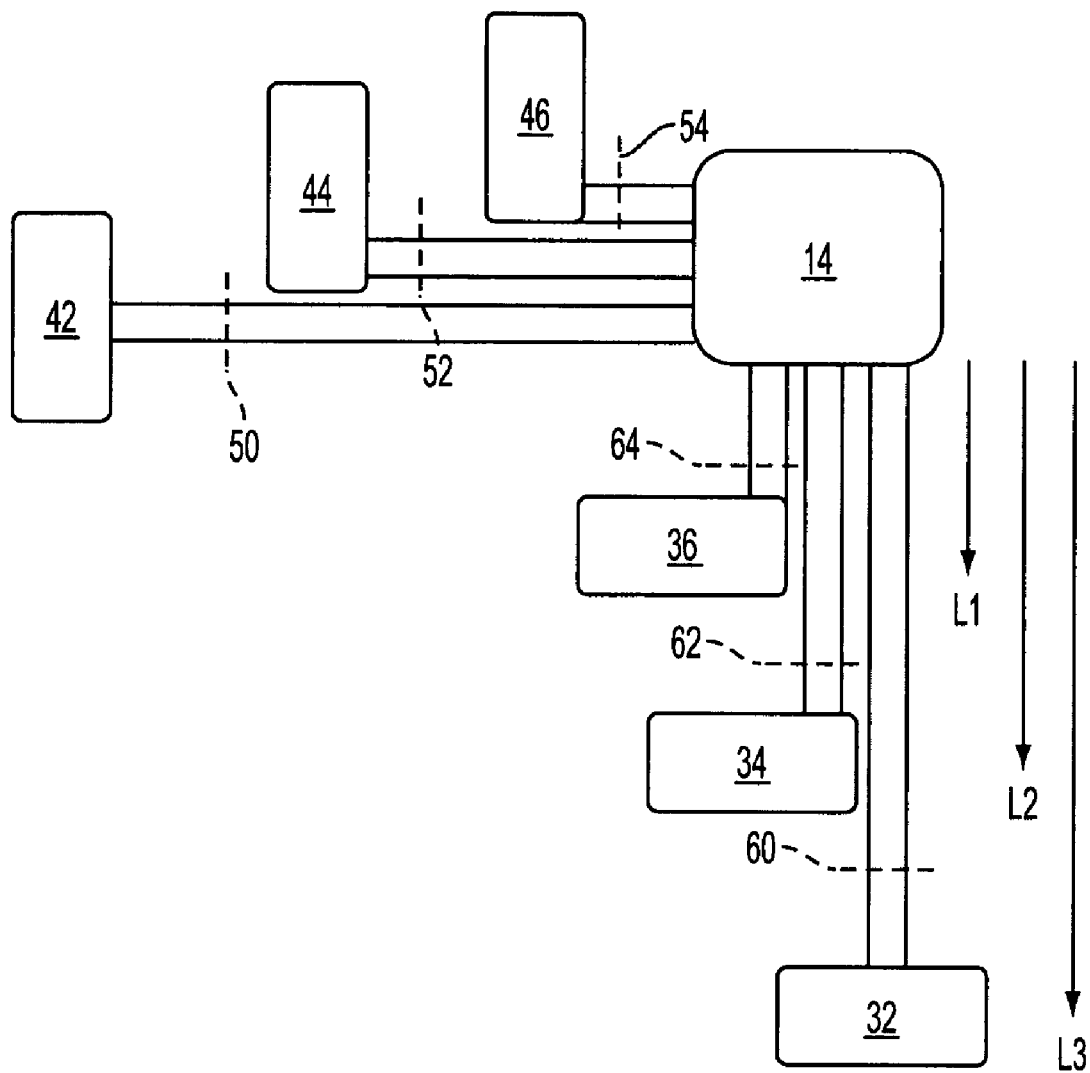
FIG. 3 shows another embodiment of a layout for a sensor tape sensing device.

FIGS. 2 and 3 show alternative embodiments for sensor tape layouts. FIG. 2 shows remote units at different angular positions radiating outwards from the controller 14. In this particular embodiment, branches would be located at 16, 18 and 22. The branch holding remote units 28 and 30 may be manufactured so that one or the other remote unit can be removable, or that the remote unit for that branch can be selectable positioned at either 28 or 30. Similarly, the branch holding remote unit 24 may have an optional remote unit site at 26, which could hold another remote unit or may be an optional placement for remote unit 24. The entire branch for remote unit 20 may be optional.

During manufacture of the sensing device, these varied positions and branches make up different configurations for the sensor tape. Once the desired arrangement of remote units is achieved, any unselected remote units may be removed or disabled. This would allow one layout of sensor tape to be manufactured, while still providing flexibility in the final arrangement of the sensing device. The flexibility may involve the positioning and lengths of the branches, or may also allow for selection of different types of sensors for each branch. For example, the remote unit 28 may be a pressure sensor and remote unit 30 may be a temperature sensor. During manufacture or when attaching the sensor tape, one or the other sensor may be desired, and the other one would be disabled, allowing simple customization of a standardized layout.

FIG. 3 shows an embodiment of a layout directed to customization of the length of the branches. It must be noted that while this discussion focuses on variable lengths, the lengths may include alternative types of remote units as well. Using the controller 14 as the base, the two different branches could be customized from a standard sensor tape. For example, the branch ending at remote unit 32 could have one of three different lengths, L1-L3.

In this embodiment, disabling an unselected remote unit would involve cutting the connection between the unselected remote unit and the controller. The cutting may be an actual cutting and removal of that remote unit and its associated portion of the substrate, or it could just be a cutting or severing of the connection itself, such as by an electrical means such as passing elevated current through the connection. In the embodiment of FIG. 3, sensors 32, 34 and 36 would be disabled by cutting at 60, 62 and 64, respectively. Severing of the connections may be also achieved by punching holes through the undesirable connections or by laser cutting or by mechanical scribing.

Independent of the configuration of that branch, the branch ending in remote unit 42 is also customizable to select a length and/or type of remote unit. Remote units 42, 44 and 46 would be disabled by cutting at 50, 52 and 54, respectively. In this manner, a standard tape layout could be manufactured but still provide variable length, and/or variable remote unit types.

Figure 4:
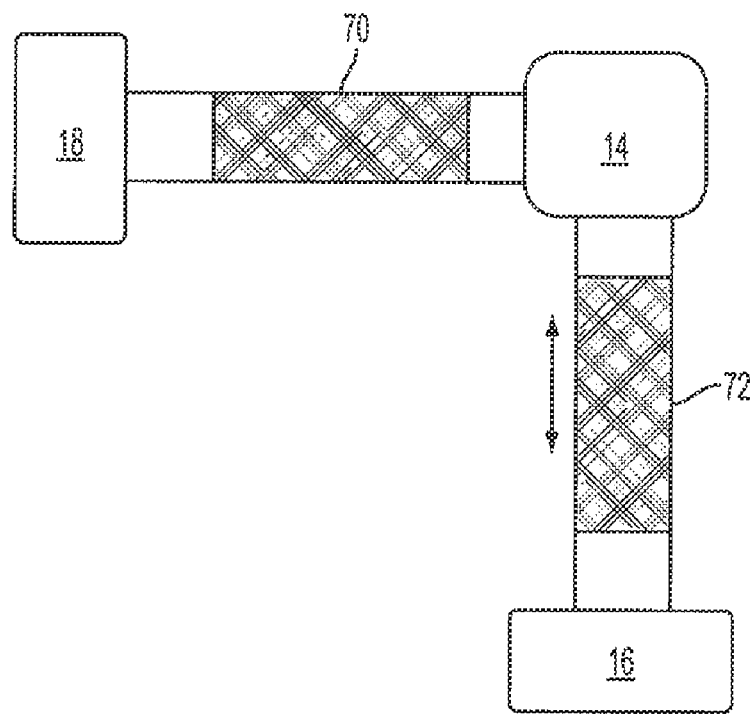
FIG. 4 shows an embodiment of an adjustable-length sensor tape.
Figure 5:
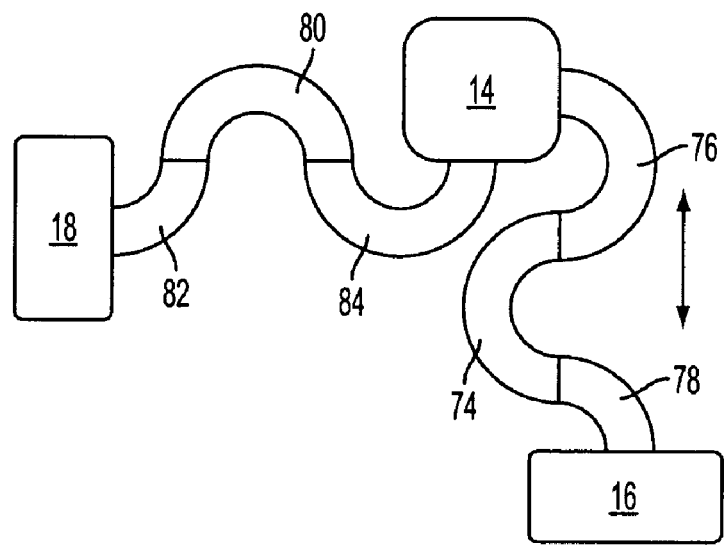
FIG. 5 shows another embodiment of an adjustable-length sensor tape.

FIGS. 4 and 5 show alternative ways of achieving variable lengths from a standard layout. In FIG. 4, the regions 70 and 72, between the control unit 14 and remote units 18 and 16, respectively, are stretchable. These stretchable sections may consist of elastomeric portions of the substrate, with associated stretchable conductive regions for electrical connection, such as using electrically conductive epoxies or polymers embedded with conductive particles. Stretchable conductors have also been achieved by patterning meandering conductive traces, such as traces of thin-film gold, on silicone (PDMS). Also, carbon nanotubes or other conductive nanowires may be patterned on or embedded in an elastomeric material such as silicone or an elastomeric urethane. Moreover, the stretchable portions 70 and 72 may consist of stretchable fabric or cloth with woven in conductive fibers. This would allow for customization of the length and/or position of the branches.

In FIG. 5, the substrate would be manufactured from a flexible substrate and the desired length could be achieved by either fully extending the branch, or allowing the branch to meander across the surface. The meandering design would take up some of the length of the branch, allowing the remote device to be positioned at a position less than the full length of the branch. Further, it may allow the remote device to be positioned at a location that is not perpendicular from the controller.

The portions 78, 74 and 76 of the branch between the controller 14 and the remote unit 16 could be bendable to allow the adjustment of the distance and position. Similarly, the portions 80, 82 and 84 of the branch between the controller 14 and the remote unit 18 would be bendable. This design may involve out-of-plane deformations that may need to be accommodated in the signal routing and electronics layout, as well as for the geometry of the tape. The tape on the surface may not begin or remain flush with the surface.

Figure 6:
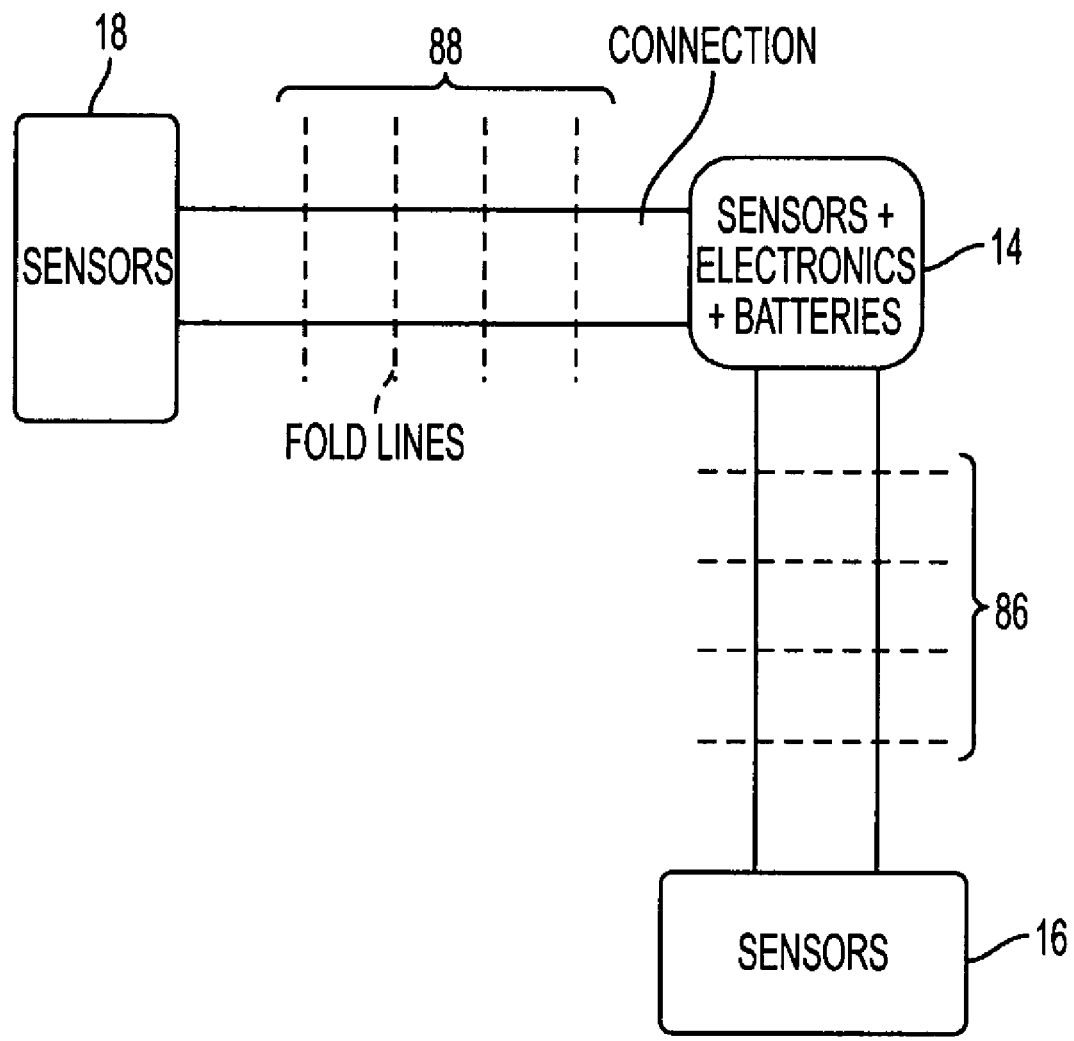
FIG. 6 shows another embodiment of an adjustable length sensor tape.

Another method of varying the length of the branches would be to manufacture the substrate such that there were fold lines in the branches. FIG. 6 shows an embodiment of this type of arrangement. The branch between the controller 14 and the remote unit 16 would have fold lines 86 that would allow adjustment of the length by overlapping the substrate along one or more of those lines. Similar fold lines 88 would exist between the controller 14 and the remote device 18, allowing an independent length to be used in that region. Instead of being folded up, the regions 88 or 86 may also be rolled up. In this case fold lines may not be needed. The examples above constitute branches have adjustable lengths.

Figure 7:
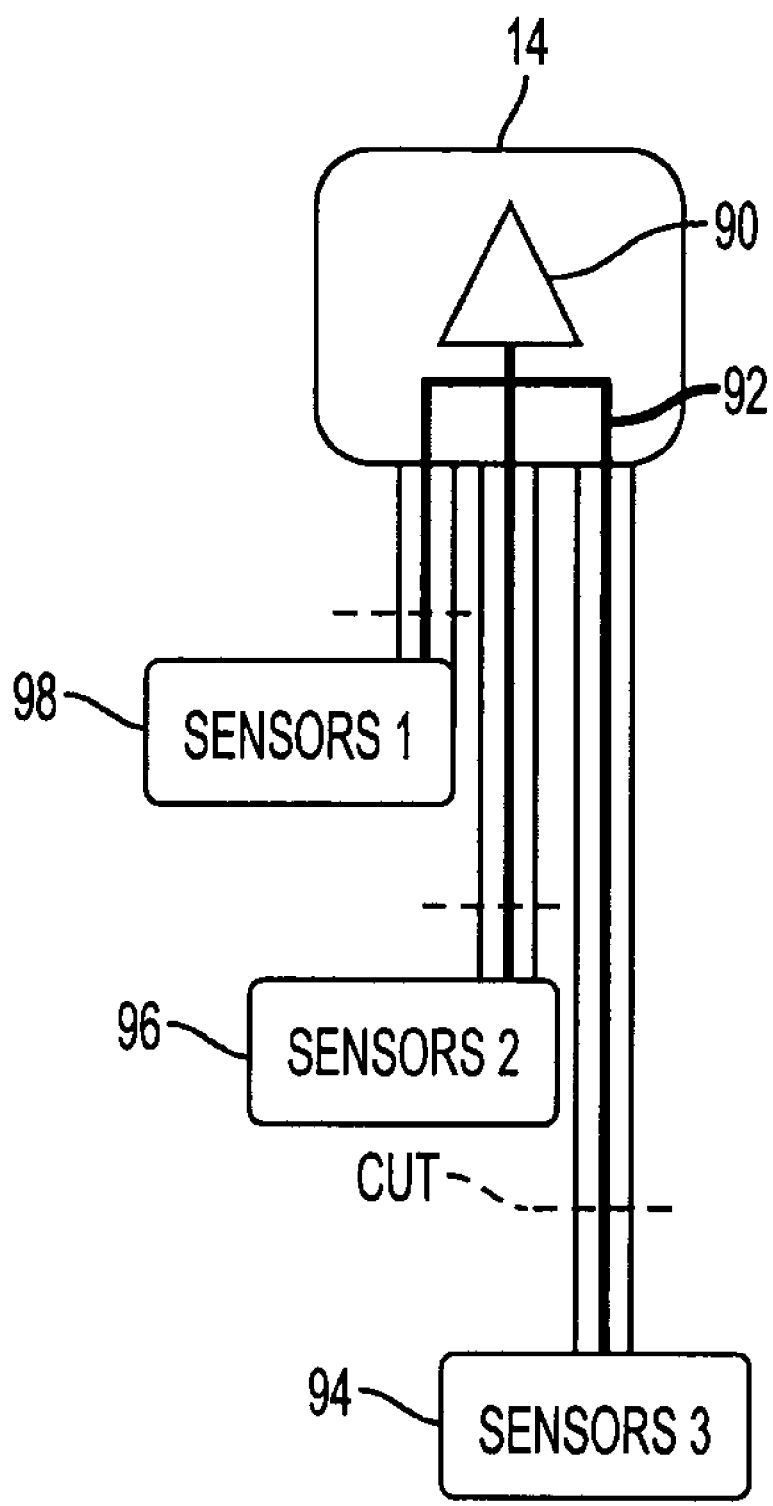
FIG. 7 shows an embodiment of an input electronics device for a sensor tape having optional branches.

The alternative layouts of FIGS. 4-6 may not require any disabling of the remote units, if there are no remote units unselected. The layouts of FIGS. 2 and 3 may require some disabling of the remote units to avoid interference at the controller end of the branch. FIG. 7 shows one possible approach.

In FIG. 7, the drive electronics reside at the controller 14, in this embodiment an amplifier 90. As discussed with regard to FIGS. 2-3, the branch may initially consist of several remote devices, such as 94, 96 and 98. When the desired remote device is selected, the connections to the other remote devices from the amplifier 90 are severed. In this embodiment, the remote device 94 remains connected along line 92 to the amplifier 90. In this manner, the amplifier only receives the desired input and no interference or noise from the unselected devices exists.

The severing of the connection may be accomplished by cutting, punching, laser scribing, mechanical scribing, electrical currents, local heating, etc. Although an amplifier is shown as the input stage, any other readout electronics, buffer circuit, signal conditioning circuit may be in place of it for receiving a sensor signal. If the remote devices 94, 96, 98 were actuators instead of sensors, the electronics in place of the amplifier circuit 90 would be driving electronics to supply the signals and power for the actuators.

In addition to the concerns about positioning and length of the branches, a concern may exist with regard to the amount of area taken up by the remote units. If the remote units take up too much space, they will increase the risk of damage to the remote units, and they may reduce the effectiveness of the surface upon which they are mounted.

Figure 8:
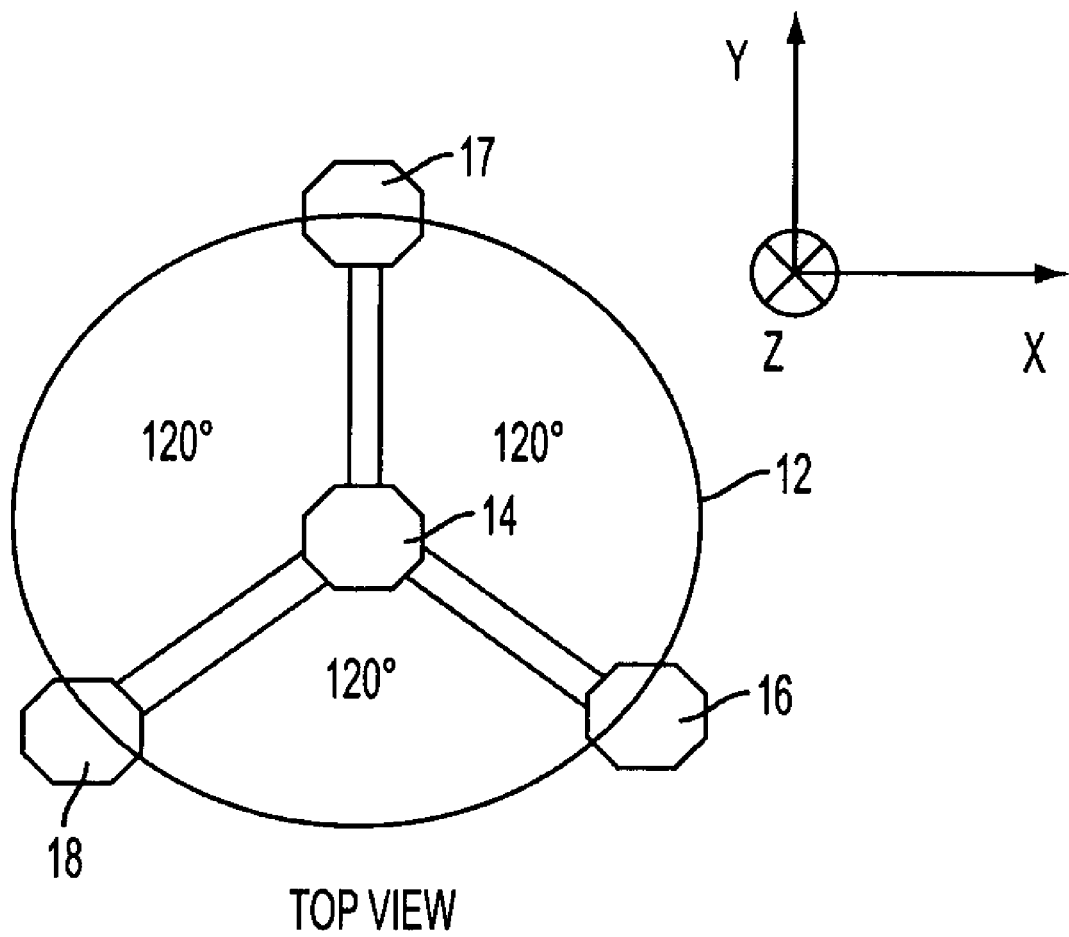
FIG. 8 shows an embodiment of a layout for sensor branches.

However, arranging the remote units in a tetrahedron shape, as shown in FIG. 8, the number of remote unit areas is minimized, while the region to which the remote units apply is maximized. As can be seen in FIG. 8, each of the remote units 16, 18 and 17, are separated from each other by approximately 120 degrees, with the controller 14 at the center of the shape. The branches for each of the remote units would curve downwards into the page as shown in the drawing when attached to a helmet, for example. This maximizes the 'active region' upon which the remote devices are operating to be very near 360 degrees, while minimizing the number of remote device regions needed. This positioning would be achieved during manufacture of the sensing device.

As mentioned above, manufacturing the sensing device would involve providing an attachable substrate and then fabricating the electronic devices on the substrate. Of course the devices may be manufactured first on a flexible substrate and the adhesive or magnetic material may be applied afterwards by lamination, spray coating or other coating methods, for example. The attachable substrate would then be arranged on the curved surface such that at least two remote units are separated from each other. Once arranged, the substrate would then be attached to the curved surface. The arranging and attaching processes may be integrated into one process.

As mentioned above, the attachable substrate may consist of a paper substrate having adhesive on at least one side, a plastic substrate, or a metal substrate. Fabricating the electronic devices may involve fabricating the devices directly on the substrate using thin film manufacturing, picking and placing discrete components manufactured elsewhere onto the substrate, a combination of thin film manufacturing and picking and placing, or printing the devices. It is possible, using conductive materials in solution for example, for a printing device to print the necessary lines and connections on the substrate directly.

For example, the tapes may be manufactured in a roll-to-roll process using printing techniques such as inkjet printing, flexographic printing, offset printing, pad printing, gravure printing, laser transfer printing or a combination of printing methods. The process may also involve lamination techniques, for example to laminate the adhesive or magnetic backing onto the flexible substrate. The process may also be a combination of printing techniques and pick and place techniques and conventional thin film patterning including thin film deposition, photolithography and etching.

In a more specific example, conducting features are printed using silver nanoparticle ink or PEDOT: PSS conducting polymers. Thin film transistors are then fabricated by printing of organic semiconductors such as polythiophenes or pentacene precursors. Sensors are then printed by printing piezoelectric polymers such as PVDF-TrFE from a solution. The substrate may include, for example, polyethylene naphthalate (PEN) from Dupont Teijin, Mylar™, Kapton™, polycarbonate, polysulfone, paper or thin stainless steel. The thickness of the substrate may vary and be in the range of 5 microns up to 100 microns. Thicker substrates are possible, but the flexibility may not be as high, thinner substrates are also possible, but the handling may become more difficult.

Once the sensor tape is manufactured, it would be arranged on the curved surface. As mentioned above, the attachable substrate may have multiple configurations. In some embodiments, the multiple configurations each have a remote unit. In some embodiments, there may be a selection of the remote unit having the desired characteristic, such as position or type of unit. The other remote units in that branch may be disabled by cutting the connection, removing the remote unit and its associated portion of the substrate, just removing the remote unit, etc.

In this manner, a standardized sensor tape layout can be manufactured and then customized to a particular, desired configuration. The sensor tape may have many different types of remote units arranged in many different types of configuration, the remote units having different positions as desired.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A sensing device, comprising:
   at least two remote sensing units mounted on an attachable tape, the remote sensing units being mounted on separate branches of the attachable tape, wherein the tape is an attachable, flexible substrate upon which the remote units and other electrical components reside, strips of which form the branches;
   a controller mounted on the attachable tape such that each branch is defined by a regions of the tape between the controller and a remote sensing unit;
   electrical connections at least between each remote sensing unit and the controller, the electrical connections on the attachable tape; and
   a surface to which the tape is attached such that the branches are separated from each other.

2. The sensing device of claim 1, wherein the flexible substrate comprises one of paper, plastic, metal, or cloth.

3. The sensing device of claim 1, wherein at least one remote sensing unit comprises a sensor for sensing one of temperature, pressure, radiation, acceleration, acoustic information, magnetic field, moisture, gases, chemical or biological substances.

4. The sensing device of claim 1, wherein the controller includes at least one of a power supply, drive electronics, memory circuits or a user read out device.

5. The sensing device of claim 1, the branches being configured in a tetrahedron layout.

6. The sensing device of claim 1, wherein the electrical connections comprise multiple electrical connections and each sensing unit comprises multiple remote sensing units and only one of the electrical connections and one of the multiple sensing units in the branch is used.

7. The sensing device of claim 1, wherein each remote sensing unit is a different distance from the controller.

8. The sensing device of claim 1, wherein the remote sensing units are pressure sensors to detect blasts and the surface is a helmet.

9. The sensing device of claim 1, wherein at least one branch has an adjustable length portion between the remote unit and the controller.

10. The sensing device of claim 9, wherein the adjustable length portion comprises one of elastomeric portions of the substrate with associated stretchable conductive regions for electrical connection; electrically conductive epoxies or polymers embedded with conductive particles; meandering conductive traces; carbon nanotubes or conductive nanowires embedded in an elastomeric material; a bendable portion; or stretchable fabric with woven conductive fibers.

* * * * *